Patented Jan. 1, 1935

1,986,049

UNITED STATES PATENT OFFICE 1,986,049

COATING

Taliaferro J. Fairley, Alexandria, La., assignor, by direct and mesne assignments, of one-half to W. J. Hunter and one-half to Mary P. Hunter, both of Shreveport, La.

No Drawing. Application July 6, 1931, Serial No. 549,117

2 Claims. (Cl. 134—17)

The present invention relates to the production of varnishes and the provision of a solvent for the so-called resins or varnish gums which are one of the usual ingredients of coating materials of this character.

It is customary with varnishes to use a vegetable oil, a drier, a thinner, a resin, and a pigment.

The present invention contemplates the use of a solvent for the gums or resins which will take the place of the usual vegetable oil or other oil heretofore employed, in making up the varnish.

The particular gum solvent employed is the distillate referred to as the end product in my application for patent executed this day and entitled the "Process of treating rubber", filed July 6, 1931, Serial No. 549,118.

The solvent employed comprises the fractions obtained by distilling vulcanized rubber to substantial dryness, or up to a temperature of about 400° C., condensing all of the resultant vapors and collecting the various fractions as a single distillate, or the solvent may comprise those fractions obtained by distilling vulcanized rubber to substantial dryness in a vacuum using lower temperatures. In each case, the fractions are collected as a single distillate and it is found that the distillate so recovered produces a very excellent drying oil.

In carrying out the invention, I take gums, such as dammar, cumar, amber, synthetic resins of which there are many varieties known to varnish makers, the copals, as well as the other conventional gums, and mix one or more thereof with the distillate or oil referred to above and in my aforesaid application.

The gum will be mixed with the solvent oil distillate and the mass heated until it reaches the desired state of fluidity. Thereupon the solution of the gum in the distillate is added to the other ingredients of the varnish and a satisfactory product is obtained. The varnish can comprise driers, such as the oxides of lead, manganese, and cobalt, thinners, such as turpentine, petroleum distillates, and alcohol, and the usual pigments.

The distillate which I employ as the solvent for the varnish gum, and which likewise is employed in place of the usual vegetable oil ingredient, as stated, is the product obtained by the distillation of vulcanized rubber to dryness, and I find that its incorporation in the varnish will render the varnish immune to the action of water, either hot or cold, and acids and alkalies. In other words, a substantially temperature-proof and chemical-resistant varnish is obtained.

In addition to the gums above referred to, I also use the polymerization product as described in my application for patent executed this day and entitled "Gums" filed July 6, 1931, Serial No. 549,119. This gum, which is a polymerization product of the distillate obtained by distilling vulcanized rubber, is likewise soluble in the distillate or oil upon suitable heating, and the resultant solution will then be incorporated with the other varnish ingredients as described.

The use of my distillate or oil in the preparation of varnish and as a solvent for the gums is particularly valuable since the oil is a drying oil and when brushed upon a surface, the resultant film will dry with great rapidity, which action is, of course, accelerated by the presence of driers. Such driers are, of course, not essential, but have been found to reduce the drying time to the point where the addition of a small amount, possibly one-half of one percent, is economically feasible, and the resultant rapid drying is, of course, much desired.

In some cases I have found it useful to employ the oil or distillate obtained as described above or in accordance with my aforementioned patent application in connection with driers, such as the oxides of lead, manganese and cobalt, and in fact various other driers which will promote oxidation of both organic and inorganic types, and I have found that the resultant solution will possess very rapid drying characteristics. The solution is very flowable and the film will be tough and an excellent coating. To prepare such a solution, it is only necessary to heat the oil and drier together when the drier will go into solution, and this product can be added as an ingredient of a varnish or coating, as desired.

It will also be understood that in preparing a gum solution of my improved distillate or oil, that the particular gum will be mixed with the oil and suitably heated until the solution is satisfactory. It is thereupon added to the other ingredients of the varnish as required.

The distillate when suitably oxidized by oxidizing agents will produce a coating material useful for making patent leather as well as a coating wherever required. This is due to the excellent drying properties of the distillate. The oxidizing agents which may be employed are lime as well as oxides, hydroxides and carbonates of the alkali and alkali metals, also oxides of lead, manganese or cobalt. In making a patent leather solution, of course, other driers in the form of oxides, gums, resins, fillers or pigments may be utilized, all of which ingredients are well-known in the manufacture of patent leather.

I claim:

1. A flowable coating comprising a drying oil which is the total distillate obtained by distilling vulcanized rubber to dryness, a resin and a drier.

2. A flowable coating comprising a drying oil which is the total distillate obtained by distilling vulcanized rubber to dryness, and a resin.

TALIAFERRO J. FAIRLEY.